H. F. Evans.

Lining Paper.

No. 3,567. Reissued Jul. 27, 1869.

Witnesses.

Chas. R. Pratt

T. J. O'Hara

Inventor.

Horace F. Evans

UNITED STATES PATENT OFFICE.

HORACE F. EVANS, OF BELOIT, WISCONSIN.

IMPROVEMENT IN THE MANUFACTURE OF TARRED PAPER, PASTEBOARD, &c.

Specification forming part of Letters Patent No. 86,380, dated February 2, 1869; reissue No. 3,567, dated July 27, 1869.

*To all whom it may concern:*

Be it known that I, HORACE F. EVANS, of Beloit, in the county of Rock and State of Wisconsin, have invented a new and useful Improvement for Saturating Paper and Straw-Board with Coal-Tar or other Water-Proof Substance; and I do hereby declare that the following is a full, clear, and exact description thereof, which will enable those skilled in the art to make and use the same, reference being had to the accompanying drawings and the letters of reference marked thereon.

This invention has for its object the saturating or partially saturating thick paper or straw-board with coal-tar, in a more economical manner than hitherto; and consists in attaching the tarring apparatus herein described to the ordinary paper-machine, so as to conduct the paper or straw-board to be saturated from the machine whereon it is made and dried directly through cold or steam-heated tar.

Figure 1:
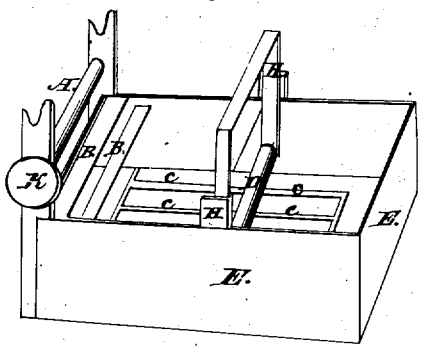
Figure 2:
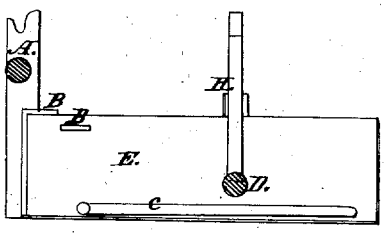
Figure 3:
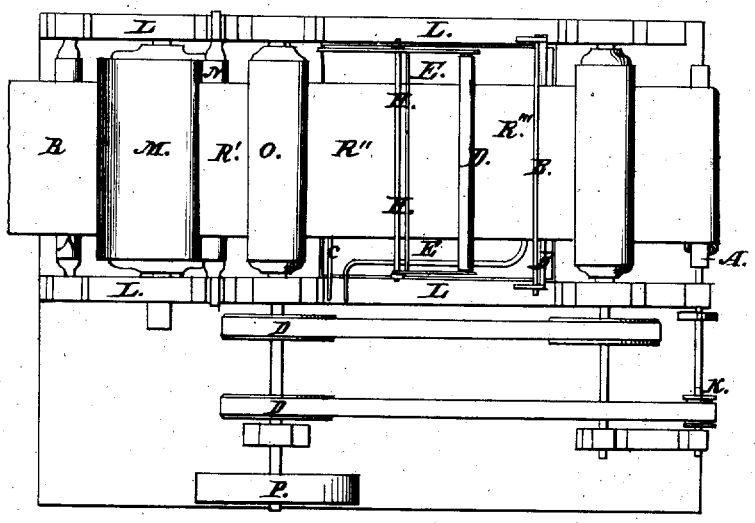

In the accompanying drawings, Figure 1 represents a perspective view of the tarring apparatus; Fig. 2, a sectional view of the same. Fig. 3 represents a view of the combined machine, showing the tarring apparatus and the ordinary paper-machine attached.

Similar letters of reference indicate like parts.

E E represent the box containing the tar; A, one of the rolls on which the tarred paper is wound, and so arranged that by withdrawing a rod the roll of saturated paper is easily removed. B B represent scrapers for removing surplus tar; C C, steam-pipes for heating the tar. D is a roll in a frame on the axles H H, so that it (the roll) can be lifted out of or depressed, when over the paper, into the tar. K is a pulley to drive the winding-roll A. L is the frame-work of the ordinary paper-machine attached. M is the drier, with which the paper may pass in contact, and turning on its journal-bearings. N N are two rollers supporting the paper in contact with the drier. O O are the calenders, one above the other, between which the paper is run. P is the driving-wheel. Q Q are belt-pulleys on an axle, operating the calenders and the roll A, as shown, by the same power. R R′ R″ R‴ is the paper shown in position when the machine is in operation.

Having thus described my invention, I claim as new and desire to secure by Letters Patent—

The process or method of saturating or partially saturating paper or straw-board by passing the same from the paper-machine whereon it is made directly from the driers or calenders through the tar or other water-proof material, in the manner and for the purpose herein substantially described.

HORACE F. EVANS.

In presence of—
CHAS. B. PRATT,
T. J. O'BRIEN.